United States Patent [19]
Kamin et al.

[11] 3,798,040
[45] Mar. 19, 1974

[54] RARE-EARTH SILICA REFRACTORY CERAMIC MATERIALS AND METHOD FOR PRODUCING SAME

[75] Inventors: George J. Kamin, Towanda; William T. Kiger, Athens, both of Pa.

[73] Assignee: GTE Sylvania Incorporated, Seneca Falls, N.Y.

[22] Filed: Mar. 2, 1971

[21] Appl. No.: 120,307

[52] U.S. Cl. .................... 106/39 R, 106/55, 106/65
[51] Int. Cl. ............................................. C04b 35/50
[58] Field of Search ......................... 106/39, 55, 65

[56] References Cited
OTHER PUBLICATIONS

Miller et al., Phase Equilibrium in the System $Nd_2O_3$–$SiO_2$, J. Am. Cer. Soc., Vol. 47, 1964, pp. 653–654, (Sci. Lib. T.P. 785A.62).

Bondar et al., Divalent and Trivalent Rare–Earth Silicates and Their Properties, Science of Ceramics, Vol. 4, 1968, pp. 309–319, (Sci. Lib. T.P. 785 S.84).

Levin et al., Phase Diagrams for Ceramists, 1969, Supp., p. 107, (Sci. Lib. Q.D. 501L.4).

*Primary Examiner*—James E. Poer
*Attorney, Agent, or Firm*—Norman J. O'Malley; Donald R. Castle; William H. McNeill

[57] ABSTRACT

Rare-earth oxide silica ceramic refractory compositions are disclosed comprising a rare-earth oxide and silica in specific mole ratios. The rare-earth oxides specifically preferred are yttrium, and misch metal. Processes for producing refractory materials as well as shaped refractory bodies are also disclosed.

12 Claims, No Drawings

RARE-EARTH SILICA REFRACTORY CERAMIC MATERIALS AND METHOD FOR PRODUCING SAME

BACKGROUND OF THE INVENTION

1. Field of the Invention

This invention pertains to ceramic refractory compositions. More specifically, it pertains to rare-earth oxide silica systems and methods for producing the compositions.

2. Prior Art

Ceramic refractory materials, such as alumina, yttria, niobia, magnesia, hafnia, zirconia, titania, beryllia, and the like, and their uses, are both well known and widespread. These materials are generally characterized by relatively high melting points and inert chemical properties. Thus, ceramic refractories find widespread usage in furnace linings, crucible materials, casting molds, heat shields, and similar material where they are usually more effective than metals. Besides the aforementioned ceramic refractories, diverse systems such as mixed oxide systems, borides, carbides, nitrides, combinations of the above-mentioned ceramic refractories, and admixtures of the above-mentioned ceramic refractories have also been used.

Although these ceramic materials have sufficed for a multitude of applications, the conditions imposed by new technological advances have surpassed the physical properties of many of the traditional ceramic compositions. The need for higher operating temperatures, for resistance to thermal shock and for the capability to withstand continued thermal cycling has taxed the established ceramics. In the same manner, the necessity for ceramics to exhibit compatibility with a variety of materials, such as molten metals and inorganic salts under both oxidizing and reducing atmosphere, has also created a need for new ceramics which exhibit the heretofore-mentioned properties.

It is believed, therefore, that new ceramic materials which possess high melting points, excellent thermal shock and thermal cycling characteristics and compatibility with a wide variety of materials under both oxidizing and reducing atmospheres is an advancement in the art.

SUMMARY OF THE INVENTION

In accordance with one aspect of this invention, there are provided refractory compositions having low thermal expansions and high melting point characteristics. The refractory compositions comprise rare-earth oxide-silica polycrystalline ceramics having a rare-earth oxide to silica mole ratio of from about 3:7 to about 9:1.

In accordance with a second aspect of this invention, there is provided a process for producing refractory compositions. The process comprises blending a rare-earth oxide and silica for about 1 to about 3 hours to form a substantially uniform admixture having a rare-earth oxide to silica mole ratio of from about 3:7 to about 9:1. The admixture is then heated at a temperature of at least about 1,500°C for at least about 1 hour to form a rare-earth oxide-silica polycrystallic ceramic.

In accordance with a third aspect of this invention, there is also provided a process for producing shaped refractory bodies. The process comprises blending a rare-earth oxide and silica for about 1 to about 3 hours to form a substantially uniform admixture, having a rare-earth oxide to silica mole ratio of from about 3:7 to about 9:1 and preheating the admixture at a temperature of at least about 1,500°C for at least about 1 hour to form a homogeneous single phase compound. The compound is then ground to a particle size so that 100 percent passes through a USS–60 mesh screen, formed into the desired shape, and thereafter heated at a temperature of at least about 1,500°C for at least about 1 hour to densify the compound to form a rare-earth oxide silica polycrystalline ceramic.

DESCRIPTION OF THE PREFERRED EMBODIMENTS

For a better understanding of the present invention, together with other and further objects, advantages and capabilities thereof, reference is made to the following disclosure and appended claims in connection with the above description of some of the aspects of the invention.

Silicates, for example $\beta$-spodumene, cordierite, and eucryptite, that have a low coefficient of thermal expansion also have low melting points and poor refractory characteristics. Silicates that have high melting points, for example $2CaO.SiO_2$ and $2MgO.SiO_2$ also have a high coefficient of thermal expansion and poor thermal shock resistance. Surprisingly, therefore, it has been found that when a rare-earth oxide and silica are combined, a ceramic refractory material having low thermal expansion and high melting point characteristics is formed. Consequently, oxide ceramics can now be made using the teaching of this patent that have refractoriness and excellent thermal shock resistance.

Referring now to the invention with greater particularity, refractory compositions are described which are chosen from the rare-earth oxide-silica pseudo-binary system. The compositions can have rare-earth oxide to silica mole ratios of from 3:7 to about 9:1. For purposes of this invention, yttrium is to be considered a rare earth. Rare-earth oxides that are preferred are yttrium, and misch metal, with yttrium being especially preferred. Compositions using the aforementioned oxides that are especially preferred include compositions having mole ratios of yttria to silica of about 1:1, 1:2, and 2:3 respectively, a composition having a mole ratio of lanthanum oxide to silica of about 1:1, and a composition having a mole ratio of misch metal to silica of about 1:1. Care is taken to have a composition containing at least about 30 mole percent rare-earth oxide. Below about 30 mole percent, the material generally doesn't densify as easily and is very porous. The addition of at least about 10 mole percent silica is important to obtain certain characteristics such as increased strength, a higher modulus of rupture, good density, and better thermal expansion properties than that obtained by yttria alone.

The preferred process for producing refractory compositions comprises blending a rare-earth oxide and silica for about 1 to 3 hours to form a substantially uniform admixture followed by heating the admixture at a temperature of at least about 1,500°C for at least about 1 hour to form a rare-earth oxide-silica polycrystalline ceramic.

When shaped refractory bodies are to be made, it is preferred to blend the rare-earth oxide and silica as mentioned above. The admixture is then preheated at a temperature of at least about 1,500°C for at least about 1 hour to form a homogeneous single phase compound. The compound is then ground so that 100 percent passes through a USS–60 mesh screen, before forming the compound into the desired shape. The compound is then heated at a temperature of at least about 1,500°C for at least about 1 hour to densify the compound to form the desired shaped ceramic.

In either process, the admixture can be heated in air, in vacuum, in hydrogen, or in an inert atmosphere. The length of time for heating is dependent on the temperature. For example, it has been found that heating at about 1,500°C in air necessitates heating times of up to about 48 hours to insure complete conversion of the admixture to the ceramic material. At about 1,600°C in air or vacuum, only about 2 hours are necessary. Temperatures below about 1,500°C can be employed, but much longer heating times are necessary to convert the admixtures to the ceramic, and as such are generally avoided for economic reasons.

Alternatives to the preferred processes can include wet or dry blending with particle comminution, depending on the physical characteristics of the raw materials, and also gel-growth formation, although this process is not conductive to volume production. Also, complete conversion can be hastened by removal of the admixture from the furnace, reblending and refiring the admixture rather than using a continual firing cycle.

For shaped refractory bodies, it is preferred to use preheated powder which has been ground and sieved as mentioned previously. Heating times and temperatures are dictated by the desired density of the final product and the composition of the material. For the compositions rich in silica, lower temperatures of the order of 1,500°C are adequate to get sintering, whereas for compositions low in silica, sintering temperatures of 1,700°–1,800°C are necessary. In the same manner, the compositions low in silica sinter readily to greater than 95 percent theoretical density, whereas the compositions rich in silica demand prolonged heating times to achieve greater than 80 percent theoretical density. Heating can be done in air, in hydrogen, or inert atmospheres, or in vacuum.

The ceramic material can be fabricated into usable forms by the methods generally used by those experienced in the art. Mechanical pressing, isostatic pressing, slip casting and the like of either the mixed raw materials or the pre-reacted powders all result in usable forms. The sieve size is generally dependent upon the method employed. For example, it has been found that about −60 to about +80 is the preferred aggregate size for isostatic pressing, and about −60 is the preferred aggregate size for mechanical pressing and slip casting. Organic binders such as polyvinyl chloride and paraffin-based emulsions can be used to improve green strength during compacting, as can inorganic binders such as phosphoric acid. In practice, however, it has been preferred to compact the powders without any binders, as the pressed pieces show good green strength and green density.

By good green strength is meant the strength after fabrication and before firing. It is normally in the area of about 500 to about 1,000 psi and the pieces can be readily handled by normal means without breaking or crumbling. By good green density is meant the density after fabrication and before firing. It is normally about 40 to about 70 percent and the pieces can be readily handled by normal means without breaking or crumbling.

The compacted shapes of either blended powder or prereacted material are then densified by firing at high temperature.

The final ceramic materials show low coefficients of thermal expansion ranging from $28 \times 10^{-7}$ in/in°C to $77 \times 10^{-7}$ in/in°C from 25°C to 800°C. The materials have high melting points ranging from 1,700°C for the high silica compositions to 2,500°C for the high yttria compositions. The ceramics show high resistance to fracture due to thermal cycling. They also show excellent compatibility with molten ferrous alloys and many nonferrous alloys. The ceramic bodies can be used in oxidizing or reducing atmospheres.

The ceramics find application in those areas where high-temperature, thermal-shock resistant materials are needed, such as crucibles (for melting metals or performing chemical reactions), kiln or furnace parts, heat shields for aerospace applications, or even automobile parts such as turbines, manifold liners, and the like. The pre-reacted powders can be used for impact formed crucibles, spray coating, or any other usage generally associated with refractory powders.

To more fully illustrate the present invention, the following examples are given. All parts, proportions, and percentages are by weight unless otherwise given.

EXAMPLE I

A blend of about 50 mole percent yttria of about 99.9 percent purity, and about 50 mole percent silica of greater than about 98 percent purity is prepared by mixing the blend for about two hours in a V-blender. The material is then passed through a number 80 sieve. The blended powders are then isostatically pressed into one-half inch diameter bars, $2 \times 2 \times 4$ inch "bricks" and small crucibles approximately 2 inches in diameter and 4 inches high, at pressures of approximately 40,000 psi. The pressed pieces are then fired at about 1,500°C for about 48 hours in an air ambient atmosphere.

The final pieces are about 80 percent theoretical density. The pieces show coefficients of thermal expansion of about $30 \times 10^{-7}$ in/in/°C in the range from about 25°C to about 800°C. The material is rapidly cycled from room temperature to about 1,100°C in excess of a hundred times without any serious flaw development. Test pieces heated to about 1,200°C and plunged into cold water also show no thermal shock damage. The compound melts congruently at 1,980°C.

Pieces of the ceramic material are put in contact with various molten metals by dropping cold pieces of the ceramic into the molten metal phase. In none of the tests do the ceramic pieces crack due to the thermal shock. Examination of the interfaces between the molten metal and ceramic after cooling shows no reaction between the materials in the case of low carbon steel, iron-nickel-cobalt alloys, nickel, aluminum or copper.

Crucibles of the ceramic are used to fire phosphor materials of the halophosphate type generally used in fluorescent lamps. The phosphor shows no darkening or loss of brightness. The crucibles were repeatedly cycled during heating and showed no thermal shock damage or deterioration due to the contact with the chloride or fluoride gases evolved from the phosphor. The crucibles are also used to fire rare-earth type television phosphors with no sign of reaction or loss of brightness.

EXAMPLE II

A composition consisting of about 33 mole percent $Y_2O_3$ and about 67 mole percent $SiO_2$ is blended, pressed, and fired as in Example I, except the composition is heated in air at about 1600°C for about 2 hours. The material is found to have a coefficient of thermal expansion of $28 \times 10^{-7}$ in/in/°C. Crucibles made of the material show results substantially the same as those shown in Example I on phosphor testing.

EXAMPLE III

A composition of about 90 mole percent $Y_2O_3$ and about 10 mole percent silica is processed as in Example I, with the exception that the final piece is sintered at about 1,700°C for about two hours in hydrogen. The material is greater than 95 percent dense and has a coefficient of thermal expansion of $77 \times 10^{-7}$ in/in/°C.

EXAMPLE IV

A blend of about 50 mole percent yttria of about 99.9 percent purity and about 50 mole percent silica of greater than about 98 percent purity is prepared by blending for about 2 hours in a V-type blender. The powder is placed in an yttria-silica crucible and fired for about 12 hours at about 1,500°C. The powder is removed from the crucible, ground in a mortar and pestle, and passed through a No. 80 sieve. The material is returned to the crucible and refired for about 12 hours at about 1,500°C.

X-ray crystallographic analysis shows the product to be pure $Y_2O_3 \cdot SiO_2$. The powders are reground, resieved and then isostatically pressed into a crucible shape at approximately 40,000 psi. The crucible is fired at about 1,750°C for about two hours in a high vacuum furnace. The density of the fired piece is greater than 90 percent of theoretical. The material exhibits characteristics substantially the same as those described in Example I.

EXAMPLE V

Mixed rare-earth oxides derived from euxenite, xenotime and monazite ores are used to prepare ceramic pieces. A list of the percentage amounts of the individual rare earths in each of the mixtures is shown in Table I. The amount of silica needed to prepare exact mole ratios of each of the individual components is determined and mixed rare-earth-oxide-silica ceramics are prepared and treated as in Example I. Various compositions using the different mixed rare-earth oxide materials are shown in Table II. All the compositions exhibited excellent refractory and thermal shock characteristics, substantially the same as those obtained in Example I.

TABLE I

Composition of Mixed Rare-Earth Oxides

| Oxide | % R.E.O. in Euxenite | % R.E.O. in Monazite | % R.E.O. in Xenotime |
| --- | --- | --- | --- |
| $La_2O_3$ | 2.9 | 17.0 | — |
| $CeO_2$ | 5.8 | 53.5 | 0.6 |
| $Pr_6O_{11}$ | 0.8 | 2.6 | 0.1 |
| $Nd_2O_3$ | 3.2 | 17.0 | 0.5 |
| $Sm_2O_3$ | 2.5 | 2.6 | 1.0 |
| $Eu_2O_3$ | — | — | — |
| $Gd_2O_3$ | 5.0 | 2.0 | 2.0 |
| $Tb_4O_7$ | 1.3 | 0.7 | 1.0 |
| $Dy_2O_3$ | 10.7 | 0.8 | 14.5 |
| $Ho_2O_3$ | 2.0 | 0.15 | 2.5 |
| $Er_2O_3$ | 8.0 | — | 12.5 |
| $Tm_2O_3$ | 0.5 | — | 2.0 |
| $Yb_2O_3$ | 6.0 | 0.15 | 17.0 |
| $Lu_2O_3$ | 0.3 | 0.10 | 3.0 |
| $Y_2O_3$ | 50.0 | 3.0 | 45.0 |

TABLE II

Mixed Rare-Earth Oxide-Silica Compositions

| Mole Ratio ($Ln_2O_3:SiO_2$) | Euxenite | Monazite | Xenotime |
| --- | --- | --- | --- |
| | | g $SiO_2$ added to 1000 g R.E.O. | |
| 3:7 | 498.6 | 416.5 | 487.7 |
| 1:2 | 427.4 | 357.0 | 418.1 |
| 2:3 | 320.5 | 267.7 | 313.5 |
| 1:1 | 213.7 | 178.5 | 209.0 |
| 3:2 | 142.5 | 119.0 | 139.4 |
| 7:3 | 91.6 | 76.5 | 89.6 |
| 4:1 | 53.4 | 44.6 | 52.3 |
| 9:1 | 23.7 | 19.8 | 23.2 |

While there has been shown and described what are at present considered the preferred embodiments of the invention, it will be obvious to those skilled in the art that various changes and modifications can be made therein without departing from the scope of the invention as defined by the appended claims.

What is claimed is:

1. A thermal shock resistant ceramic composition consisting essentially of from about 30 to about 90 mole percent of a rare earth oxide selected from the group consisting of yttrium and misch metal oxide and from about 10 to about 70 mole percent of silicon dioxide, having a coefficient of thermal expansion of from about $28 \times 10^{-7}$ inches per inch °C to about $77 \times 10^{-7}$ inches per inch °C, from about 25° C to 800° C and a melting point of from about 1,700° C to about 2,500° C.

2. A refractory composition according to claim 1, wherein said rare-earth oxide is yttria.

3. A refractory composition according to claim 2, wherein the mole ratio of said yttria to said silica is about 1:1.

4. A refractory composition according to claim 3, wherein the mole ratio of said yttria to said silica is about 1:2.

5. A refractory composition according to claim 4, wherein the mole ratio of said yttria to said silica is about 2:3.

6. A refractory composition according to claim 1, wherein said rare-earth oxide is misch metal oxide.

7. A refractory composition according to claim 6, wherein the mole ratio of said misch metal oxide to silica is about 1:1.

8. A process for producing shaped refractory bodies which comprises:
   a. blending a rare-earth oxide selected from the group consisting of yttrium oxide and misch metal oxide and silica for about 1 to about 3 hours to form a substantially uniform admixture having a rare-earth oxide to silica mole ratio of from about 3:7 to about 9:1;

b. preheating said admixture at a temperature of at least about 1,500° C for at least about 1 hour to form a homogeneous single phase material;

c. grinding said compound to a particle size such that 100 percent passes through a USS 60 mesh screen;

d. compacting said compound into the desired shape having a density of from about 40 to about 70 percent theoretical, and e. heating said compound at a temperature of at least about 1,500° C for at least about 1 hour to densify the compound to form a rare-earth oxide silica polycrystalline ceramic having a theoretical density greater than 80 percent.

9. A process according to claim 8, wherein said rare-earth oxide is yttrium.

10. A process according to claim 8, wherein said rare-earth oxide is misch metal.

11. A process according to claim 8, wherein said preheating is from about 1 to about 48 hours at a temperature of about 1,500°C to about 1,800°C.

12. A process according to claim 8, wherein said heating is from about 1 to about 12 hours at a temperature of from about 1,500°C to about 1,800°C.

* * * * *

UNITED STATES PATENT OFFICE
CERTIFICATE OF CORRECTION

Patent No. 3,798,040                    Dated March 19, 1974

Inventor(s) George J. Kamin and William T. Kiger

It is certified that error appears in the above-identified patent and that said Letters Patent are hereby corrected as shown below:

Column 6, Claim 1, line 4 - delete "yttrium and" and insert -- yttrium oxide and --.

Column 8, Claim 10, line 6 - delete "misch metal" and insert -- misch metal oxide --.

Signed and sealed this 30th day of July 1974.

(SEAL)
Attest:

McCOY M. GIBSON, JR.                    C. MARSHALL DANN
Attesting Officer                       Commissioner of Patents